United States Patent
Han et al.

(10) Patent No.: US 10,942,333 B2
(45) Date of Patent: *Mar. 9, 2021

(54) OPTICAL SYSTEM

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Amir Arbabi, Pasadena, CA (US); Andrei Faraon, Pasadena, CA (US); Sungwoo Hwang, Seoul (KR); Jangwoo You, Seoul (KR); Byounglyong Choi, Seoul (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,554

(22) Filed: Mar. 16, 2018

(65) Prior Publication Data

US 2018/0267270 A1    Sep. 20, 2018

Related U.S. Application Data

(63) Continuation of application No. 15/134,885, filed on Apr. 21, 2016, now Pat. No. 9,946,051.
(Continued)

(30) Foreign Application Priority Data

Jan. 12, 2016 (KR) .................. 10-2016-0003672

(51) Int. Cl.
*G02B 9/14* (2006.01)
*G02B 13/00* (2006.01)
(Continued)

(52) U.S. Cl.
CPC ............... *G02B 9/14* (2013.01); *G02B 1/002* (2013.01); *G02B 3/08* (2013.01); *G02B 5/1876* (2013.01);
(Continued)

(58) Field of Classification Search
CPC .. G02B 9/14; G02B 13/0035; G02B 13/0055; G02B 3/08; G02B 9/12; G02B 9/34;
(Continued)

(56) References Cited

U.S. PATENT DOCUMENTS 5,086,338 A    2/1992    Usui
8,755,131 B2   6/2014    Kuo
(Continued)

FOREIGN PATENT DOCUMENTS

KR    1020070009768 A    1/2007

OTHER PUBLICATIONS

Caroline Perry, "Perfect colors, captured with one ultra-thin lens", Harvard John A. Paulson School of Engineering and Applied Science, Feb. 19, 2015, Total 8 pages.
(Continued)

*Primary Examiner* — Jordan M Schwartz
(74) *Attorney, Agent, or Firm* — Sughrue Mion, PLLC (57) ABSTRACT

An optical system and an image sensor including the same are provided. The optical system includes first, second, and third optical devices. At least one of the first, second, and third optical devices is a thin-lens including nanostructures.

19 Claims, 9 Drawing Sheets

Related U.S. Application Data (60) Provisional application No. 62/151,108, filed on Apr. 22, 2015.

(51) Int. Cl.

| | | |
|---|---|---|
| *G02B 9/12* | (2006.01) | |
| *G02B 13/18* | (2006.01) | |
| *G02B 27/00* | (2006.01) | |
| *G02B 1/00* | (2006.01) | |
| *G02B 3/08* | (2006.01) | |
| *G02B 5/18* | (2006.01) | |
| *G02B 9/10* | (2006.01) | |

(52) U.S. Cl.
CPC ................ *G02B 9/10* (2013.01); *G02B 9/12* (2013.01); *G02B 13/003* (2013.01); *G02B 13/0035* (2013.01); *G02B 13/0055* (2013.01); *G02B 13/18* (2013.01); *G02B 27/0025* (2013.01); *H05K 999/99* (2013.01); *G02B 2207/101* (2013.01)

(58) Field of Classification Search
CPC ... G02B 9/60; G02B 9/62; G02B 9/64; G02B 13/003; G02B 13/004; G02B 13/18; G02B 27/0025; G02B 1/002; G02B 1/041; H04N 5/2254; H04N 5/3696
See application file for complete search history.

(56) References Cited

U.S. PATENT DOCUMENTS

| | | | |
|---|---|---|---|
| 9,946,051 B2 * | 4/2018 | Han | .................. G02B 5/1876 |
| 2007/0091472 A1 | 4/2007 | Alkemper et al. | |
| 2012/0328240 A1 | 12/2012 | Ma et al. | |
| 2013/0229704 A1 | 9/2013 | Smolyaninov | |
| 2013/0335827 A1 | 12/2013 | Brueckner et al. | |
| 2014/0153114 A1 | 6/2014 | Suzuki | |
| 2016/0133762 A1 | 5/2016 | Blasco Claret | |

OTHER PUBLICATIONS

Communication dated Jul. 31, 2017 from the U.S. Patent and Trademark Office in U.S. Appl. No. 15/134,885.

* cited by examiner

OPTICAL SYSTEM

CROSS-REFERENCE TO RELATED APPLICATION

This application is a continuation application of U.S. application Ser. No. 15/134,885, filed Apr. 21, 2016, which claims the benefit of provisional U.S. Provisional Application No. 62/151,108, filed on Apr. 22, 2015, in the U.S. Patent and Trademark Office and Korean Patent Application No. 10-2016-0003672, filed on Jan. 12, 2016, in the Korean Intellectual Property Office, the disclosures of which are incorporated herein in their entireties by reference.

This invention was made with government support under Grant No. W911NF-14-1-0345 awarded by the ARO-US Army. The government has certain rights in the invention.

BACKGROUND

1. Field

Apparatuses and systems consistent with exemplary embodiments relate to optical systems and image sensors including the same.

2. Description of the Related Art

Optical sensors including semiconductor sensor arrays are frequently used in mobile devices, wearable devices, and the Internet of Things. Although such devices are ideally small, it is difficult to reduce the thicknesses of optical systems included in such sensor arrays.

Conventional optical systems using optical lenses include many optical lenses in order to remove chromatic aberration and geometric aberration and ensure a desired f-number. Since the optical lenses must have predetermined shapes in order to perform their respective functions, there is a limitation in reducing the thicknesses of such conventional optical systems.

SUMMARY

One or more exemplary embodiments provide optical systems that may be designed to be small and image sensors including such optical systems.

Additional exemplary aspects and advantages will be set forth in part in the description which follows and, in part, will be apparent from the description, or may be learned by practice of the presented embodiments According to an aspect of an exemplary embodiment, an optical system includes: a first optical device configured to focus incident light onto different focal points according to incident angles of the incident light; a second optical device configured to focus light transmitted through the first optical device to have different focal lengths according to the position on the second optical device on which the light having been transmitted through the first optical device is incident; and a third optical device configured so that light transmitted through the second optical device forms focal points on an image plane, wherein at least one of the first through third optical devices is a thin-lens comprising a plurality of nanostructures.

The second optical device may be configured so that light incident on the second optical device farther from principal optical axis of the second optical device is focused by a longer focal length.

The third optical device may be configured so that light incident on the third optical device farther from principal optical axis of the third optical device is focused by a shorter focal length.

The first optical device may have positive refractive power, the second optical device may have negative refractive power, and the third optical device may have positive refractive power.

The third optical device may change a direction of light so that light transmitted by the third optical device is incident on the image plane at an angle normal to the image plane.

The first optical device may be a refractive optical lens, and the second and third optical devices may be thin-lenses.

Nanostructures of the second optical device and nanostructures of the third optical device may be configured to offset chromatic aberration of the whole optical system including the first, second and third optical devices.

The first optical device may be configured to offset at least one of a geometric aberration and a chromatic aberration that occur in the second and third optical devices.

The first optical device may be a thin-lens, and the second and third optical devices may be refractive optical lenses.

Nanostructures included in the first optical device may be configured and arranged to offset at least one of a chromatic aberration and a geometric aberration that occur in the second and third optical devices.

The first optical device may be provided on a surface of the second optical device.

The thin-lens may include a substrate on which the plurality of nanostructures are arranged.

The plurality of nanostructures may have a refractive index greater than a refractive index of the substrate.

The substrate may include at least one of glass (e.g., fused silica or BK7), quartz, polymer (e.g., poly(methyl methacrylate) (PMMA)), and plastic, and the plurality of nanostructures may include at least one of crystalline silicon (c-Si), polycrystalline silicon (p-Si), amorphous silicon (a-Si), III-V compound semiconductors (e.g., GaP, GaN, or GaAs), SiC, $TiO_2$, and SiN.

The plurality of nanostructures may have at least one of a circular cylindrical shape, an elliptic cylindrical shape, a rectangular parallelepiped and a polygonal prism shape. They may be vertically structured to have multiples of high refractive index and low refractive index layers.

The first through third optical devices may be configured so that only light of a predetermined wavelength range from among incident light forms a focal point on the image plane.

The optical system may further include an optical filter configured to block light having wavelengths outside the predetermined wavelength range.

According to an aspect of another exemplary embodiment, an image sensor includes: at least one optical system including: a first optical device configured to concentrate incident light at different focal points according to incident angles of the incident light; a second optical device configured to focus light transmitted through the first optical device to have different focal lengths according to the position on the second optical device on which the light having been transmitted through the first optical device is incident; and a third optical device configured so that light transmitted through the second optical device forms focal points on an image plane; and at least one light measurer respectively corresponding to the at least one optical system and configured to measure light incident on the image plane of the at least one optical system, wherein at least one of the first through third optical devices is a thin-lens including a plurality of nanostructures.

A plurality of the optical systems and a plurality of the light measurers may be provided, wherein at least two of the plurality of optical systems are configured so that light of different wavelength ranges form focal points on the image plane.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

The inventive concept will now be described more fully with reference to the accompanying drawings, in which exemplary embodiments of the invention are shown. In the drawings, the same reference numerals denote the same elements and sizes of components may be exaggerated for clarity. The inventive concept may have different forms and should not be construed as limited to the exemplary embodiments set forth herein. For example, it will also be understood that when a layer is referred to as being "over" another layer or a substrate, it can be directly on the other layer or the substrate, or intervening layers may also be present therebetween.

As used herein, the term "and/or" includes any and all combinations of one or more of the associated listed items. Expressions such as "at least one of," when preceding a list of elements, modify the entire list of elements and do not modify the individual elements of the list.

Figure 1:
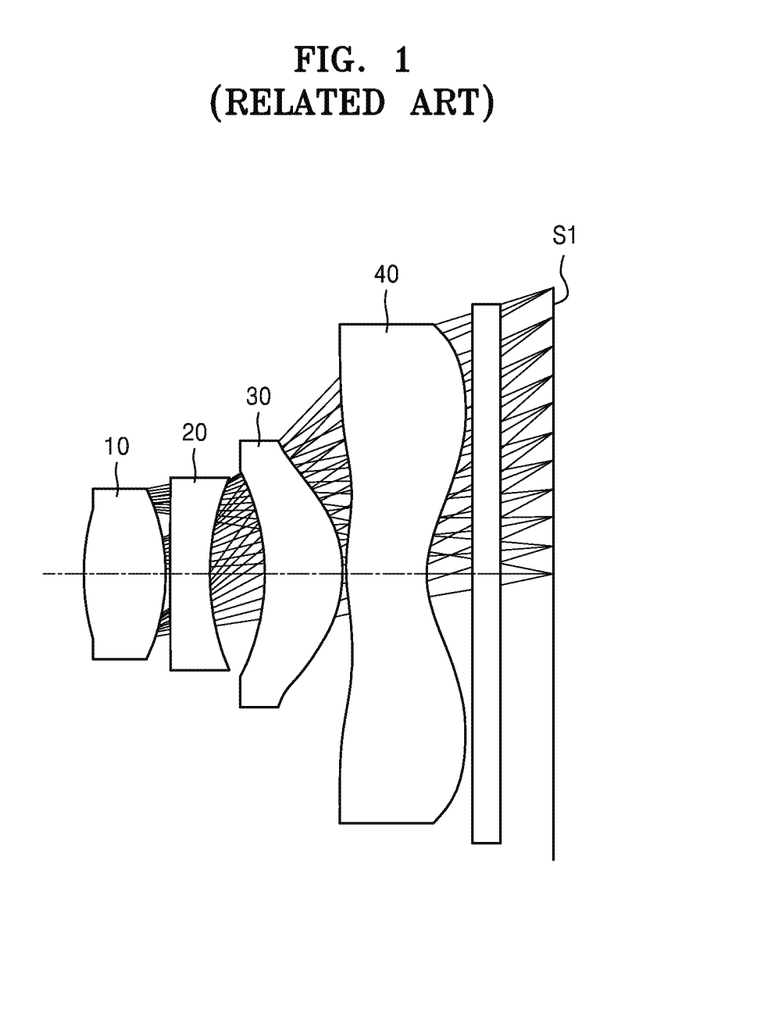
FIG. 1 is a view of a related art optical system including refractive optical lenses.

FIG. 1 is a view of a related art optical system including optical lenses 10, 20, 30, and 40. The optical lenses 10, 20, 30, and 40 are refractive lenses.

Each of the optical lenses 10, 20, 30, and 40 may include a material having a refractive index different from that of a medium outside the optical lens. A path of light passing through each of the optical lenses 10, 20, 30, and 40 may be changed by changing at least one of a refractive index of the lens, and the shape of the lens, for example, the curvature of a surface of the lens. Also, a light-converging point on an image plane S1, as formed by light transmitted through the optical system, may be changed by appropriately changing the shapes of the optical lenses 10, 20, 30, and 40 and/or intervals between the optical lenses 10, 20, 30, and 40.

However, since a refractive index of a refractive optical lens is different for different wavelengths of light, chromatic aberration may occur. Also, the light-converging points formed by light transmitted through an optical lens may have geometric aberration in which a focus is distorted. For example, geometric aberration in which a plane on which a focus is formed is not flat but curved, may lead to field curvature.

In order to control chromatic aberration and geometric aberration, an optical system may be designed by combining lenses having various shapes. However, in this case, since a number of optical lenses having various shapes are included in the optical system, the thickness of the optical system may be increased. Alternately, when the thickness of the optical system is reduced, that is, an f-number of the lenses is reduced, the ratio of a thickness to a diameter of each of the lenses may be increased. The f-number of a lens is a number obtained by dividing a focal length of the lens by a diameter of the lens, and the luminance of an image projected by the lens is dependent, in part, on the f-number. Clearly, if the thickness of each lens in an optical system is increased, there is limit in the degree to which the total thickness of the optical system may be reduced.

In order to reduce the size of an optical system, the thickness of the optical system has to be reduced and the f-number of each of the lenses included in the optical system has to be reduced to a predetermined value or less. Since there is a limit by using refractive index-based lenses, a new thin-lens may be used to achieve these objectives.

Figure 2:
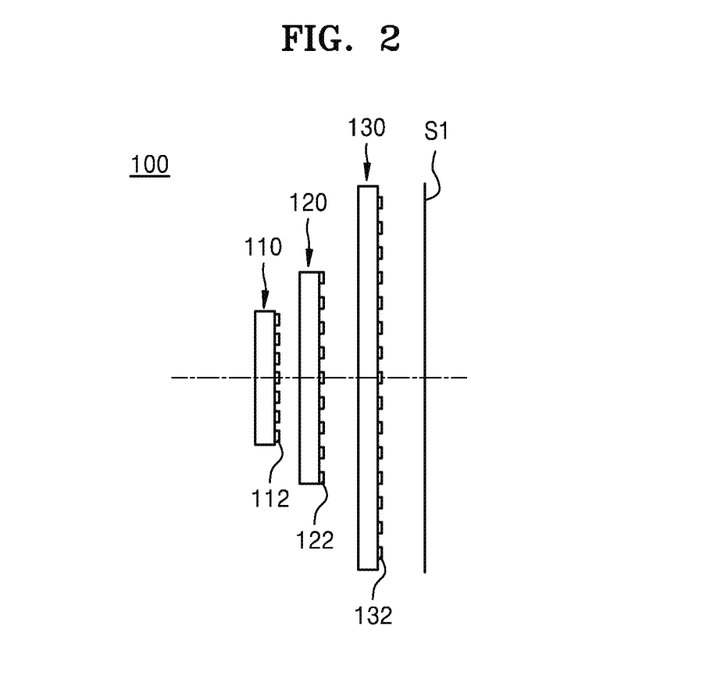
FIG. 2 is a view of an optical system according to an exemplary embodiment.

FIG. 2 is a view of an optical system 100 according to an exemplary embodiment.

Referring to FIG. 2, the optical system 100 according to an exemplary embodiment may include a first optical device 110 configured to focus incident light so that the location of a focal point of the incident light is dependent on the incident angle of the light, a second optical device 120 configured to focus light having been transmitted through the first optical device 110 so that the light transmitted through the second optical device 120 has a focal length that is dependent on the location of the focal point of the light transmitted through the first optical device 110, and a third optical device 130 configured so that light transmitted through the second optical device 120 is focused onto focal points on the image plane S1.

At least one of the first through third optical devices 110, 120, and 130 may be a thin-lens comprising a substrate on which plurality of nanostructures are provided. The term 'thin-lens' refers to an optical device that alters a path of light transmitted therethrough by adjusting a phase delay and a phase delay distribution of the transmitted light according to nanostructures disposed on a surface of a substrate. In contrast, as discussed above, an optical lens determines a path of light transmitted therethrough according to the shape and refractive index of the optical lens. Accordingly, a degree to which the thickness of a thin-lens array can be reduced is not limited in the way that the thickness of an optical lens array is limited, and a thin-lens array may be quite thin.

The nanostructures may have a sufficiently greater refractive index than that of a medium outside the nanostructures and may have a transmittance and a transmission phase dependent on a shape and a material of the nanostructures. Light incident on nanostructures is coupled in one or more waveguide modes of the nanostructures and resonates within the nanostructures. Amplitudes and phases of light transmitted through or reflected from the nanostructures may be determined by such resonance characteristics. In order to form a desired optical device (e. g. a thin-lens), nanostructures may be arranged, and the shapes of the nanostructures may be determined in accordance with a transmission phase and amplitude distribution (e.g., a converging or diverging wave front) of the desired optical device.

Although nanostructures 112, 122, and 132 are respectively illustrated on surfaces of substrates of the first through third optical devices 110, 120, and 130 facing the image plane S1 in FIG. 2, the present exemplary embodiment is not limited thereto. For example, the nanostructures 112, 122, and 132 may be provided on surfaces of substrates of the first through third optical devices 110, 120, and 130 on which light is incident. Alternatively, the nanostructures 112, 122, and 132 may be provided on both surfaces of substrates of the first through third optical devices 110, 120, and 130.

Also, although the first through third optical devices 110, 120, and 130 of FIG. 2 are all thin-lenses, the present exemplary embodiment is not limited thereto. For example, one or two of the first through third optical devices 110, 120, and 130 may be designed as thin-lenses, and the remaining one or more lenses may be optical lens(es).

Figure 3:
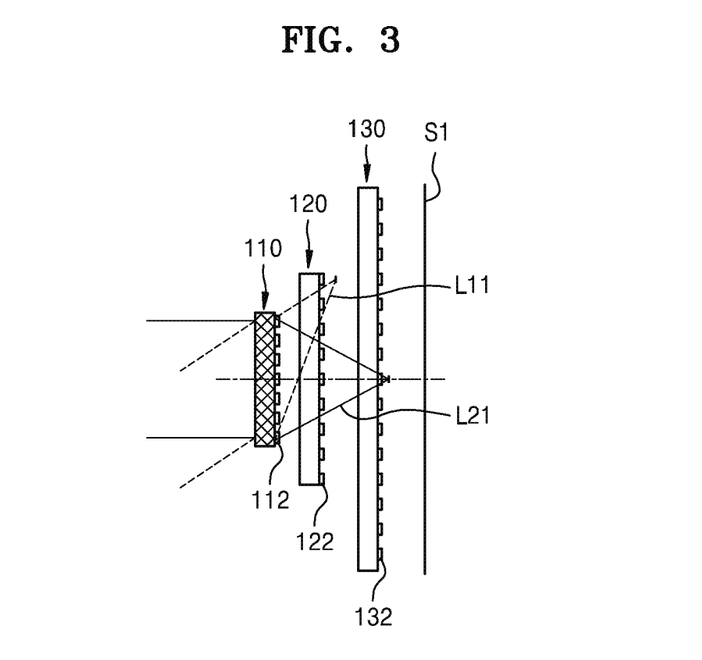
FIG. 3 is a view illustrating a state in which incident light passes through a first optical device according to an exemplary embodiment.

Light reflected from an object (not shown) may be incident on the first optical device 110. FIG. 3 is a view illustrating a state in which incident light is transmitted through the first optical device 110 according to an exemplary embodiment.

Referring to FIG. 3, the first optical device 110 may focus incident light so that the focal point of the incident light is dependent on the incident angle of the incident light. For example, second incident light L21 is incident in a direction parallel to an arrangement direction in which the first through third optical devices 110, 120, and 130 are arranged (e.g. a direction normal to planes of each of the first through third optical devices 110, 120, and 130—i.e. a left-to-right direction as illustrated in FIG. 3), and the second incident light L21 may therefore be directed to a focal point along a line parallel to the arrangement direction which passes through the center of the second optical device 120, as shown in FIG. 3. In contrast, first incident light L11, which is incident on the first optical device 110 in a direction oblique to the arrangement direction may be directed to a focal point spaced away from a line which passes through the center of the second optical device 120. The first optical device 110 may include the plurality of nanostructures 112 provided on a surface of a substrate thereof, such that the path of light incident thereon is re-directed.

The nanostructures 112 may be provided on a surface of a substrate of the first optical device 110 facing the image plane S1. However, the present exemplary embodiment is not limited thereto. Alternatively, the nanostructures 112 may be provided on a surface of a substrate on which light is incident. Alternatively, the nanostructures 112 may be provided on both surfaces of a substrate of the first optical device 110.

The nanostructures 112 provided on a surface of a substrate of the first optical device 110 may be designed so that the first optical device 110 functions as a lens having positive refractive power. By selecting the shapes and heights of and the intervals between the nanostructures 112, the first optical device 110 may be made to change a path of light incident thereon in the same way that a lens having positive refractive power changes a path of light incident thereon. Thus, since the first optical device 110 has positive refractive power and is arranged substantially parallel to the second and third optical devices 120 and 130, the first incident light L11, incident in a direction oblique to the arrangement direction of the first through third optical devices 110, 120, and 130—i.e. incident at a non-normal angle with respect to a plane of the first optical device 110, may be directed to a focal point at off a principal axis of the first optical device 110. The principal axis of the first optical device is illustrated by the long- and short-dashed line of FIG. 3. Also, the second incident light L21, incident in a direction normal to the plane of the first optical device 110, may be directed to a focal point along the principal axis of the first optical device 110.

Figure 4:
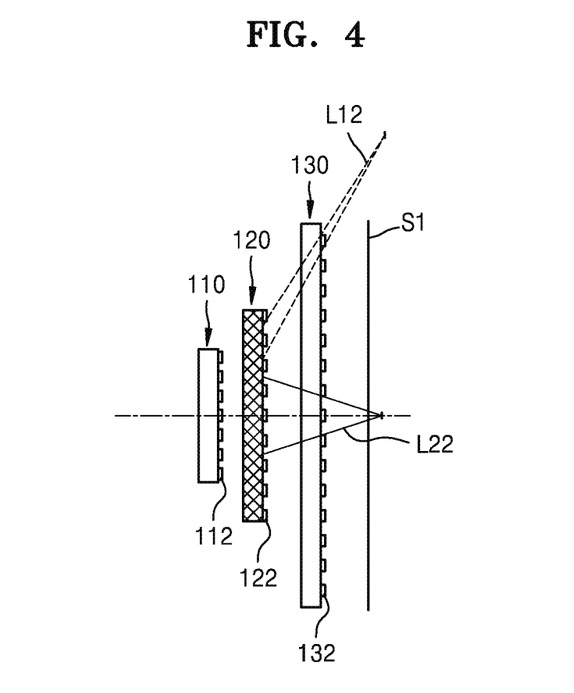
FIG. 4 is a view illustrating a state in which light passes through a second optical device according to an exemplary embodiment.

Light transmitted through the first optical device 110 may be incident on the second optical device 120. The second optical device 120 may focus light incident thereon so that the light transmitted through the second optical device 120 has a focal length dependent on the position on the second optical device 120 on which the light is incident.

FIG. 4 is a view illustrating a state in which light passes through the second optical device 120 according to an exemplary embodiment.

Referring to FIG. 4, the second optical device 120 may focus light so that the focal lengths of the light depend on the position on the second optical device on which the light is incident. For example, second light L22 is incident on a center of the second optical device 120 and is focused to have a relatively short focal length. In contrast, first light L12 is incident on an edge of the second optical device 120 and is focused to have a relatively long focal length. Since the second optical device 120 focuses incident light so that light incident on an edge has a longer focal length, an optical path difference according to an incident angle may be compensated for. The second optical device 120 may include the plurality of nanostructures 122 provided on a surface of a substrate thereof in order to refract incident light.

The nanostructures 122 may be provided on a surface of a substrate the second optical device 120 facing the image plane S1. However, the present exemplary embodiment is not limited thereto. Alternatively, the nanostructures 122 may be provided on a surface a substrate of the second optical device 120 on which light is incident. Alternatively, the nanostructures 122 may be provided on both surfaces of a substrate of the second optical device 120.

The nanostructures 122 provided on a surface of the substrate of the second optical device 120 may be designed so that the second optical device 120 functions as a lens having negative refractive power. By selecting the shapes and heights of and the intervals between the nanostructures 122, the second optical device 120 may be made to change a path of light incident thereon, like a lens having negative refractive power. Thus, since the second optical device 120 has negative refractive power and is arranged substantially parallel to the first and third optical devices 110 and 130, the first incident light L12, incident in a direction oblique to the arrangement direction of the first through third optical devices 110, 120, and 130 (incident at a non-normal angle with respect to a plane of the first optical device 120) may be focused to have a relatively long focal length. Also, the second incident light L22, incident in a direction normal to the plane of the second optical device 120, may be focused to have a relatively short focal length.

Figure 5:
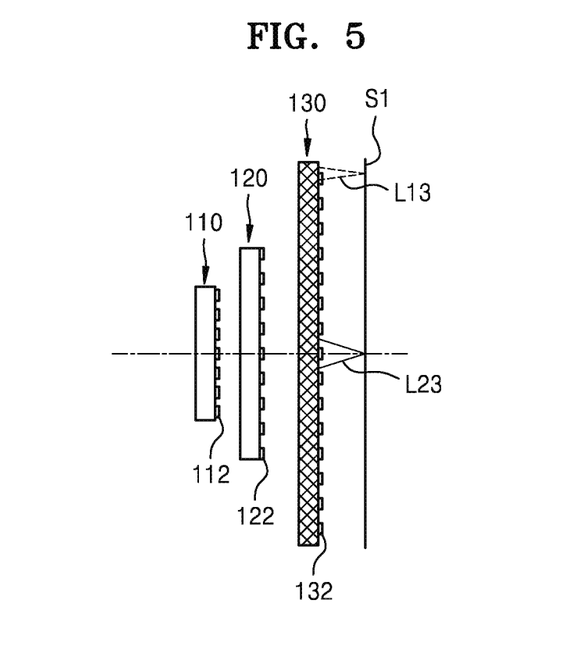
FIG. 5 is a view illustrating a state in which light passes through a third optical device according to an exemplary embodiment.

Light having been transmitted through the second optical device 120 may be incident on the third optical device 130. The third optical device 130 may change a path of light having passed through the second optical device 120 to form a focal point on the image plane S1. In this case, the image plane S1 may be an arbitrary plane spaced apart by a predetermined interval from the third optical device 130. The image plane S1 may be flat. However, the present exemplary embodiment is not limited thereto, and the image plane S1 may be curved.

FIG. 5 is a view illustrating a state in which light passes through the third optical device 130 according to an exemplary embodiment.

Referring to FIG. 5, the third optical device 130 may be configured so that light incident on the third optical device 130 form focal points on the image plane S1. In this case, the third optical device 120 may change paths of light having passed through the third optical device 130 so that the light having passed through the third optical device 130 is incident on the image plane S1 at an angle normal to the image plane. However, the present exemplary embodiment is not limited thereto. Alternatively, light having passed through different positions on the third optical device 130 may be incident at different angles on the image plane S1.

For example, the third optical device 130 may be configured so that light incident toward an edge of the third optical device 130 has a transmission phase distribution having a short focal length. That is, first light L13 incident on an edge of the third optical device 130 may be focused to have a transmission phase distribution having a relatively short focal length. In contrast, second light L23 incident on a center of the third optical device 130 may be focused to have a transmission phase distribution having a relatively long focal length. Since the third optical device 130 focuses light so that the light has different focal lengths of the third optical device dependent on the position on the third optical device 130 on which the light is incident. The light having passed through the third optical device 130 may form imaging focal points on the image plane S1. The third optical device 130 may include the plurality of nanostructures 132 provided on a surface of a substrate thereof in order to change a travel direction of incident light.

The nanostructures 132 may be provided on a surface of a substrate of the third optical device 130 facing the image plane S1. However, the present exemplary embodiment is not limited thereto. Alternatively, the nanostructures 132 may be provided on a surface of a substrate of the third optical device 130 on which light is incident. Alternatively, the nanostructures 132 may be provided on both surfaces of a substrate of the third optical device 130.

The nanostructures 132 provided on a surface of a substrate of the third optical device 130 may be designed so that the third optical device 120 functions as a lens having positive refractive power. By adjusting the shapes and heights of and the intervals between the nanostructures 132, the third optical device 130 may be made to deflect light at each location, like a lens having positive refractive power. Since the third optical device 130 has a positive refractive power, the first incident light L13 incident in a direction oblique to the arrangement direction of the first through third optical devices 110, 120, and 130 may be focused by a relatively short focal length of the third optical device in the location where L13 is incident. Also, the second incident light L23 incident in a direction parallel to the arrangement direction of the first through third optical devices 110, 120, and 130 may be focused by a relatively long focal length of the third optical device in the location where L13 is incident.

Figure 6:
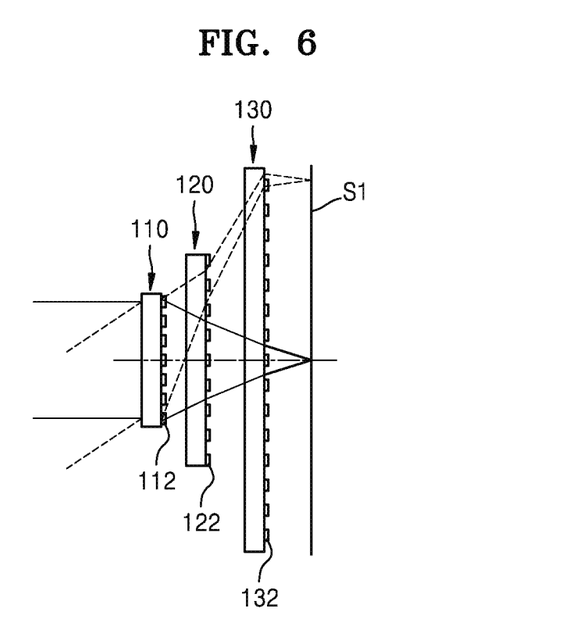
FIG. 6 is a view illustrating an entire optical path of the optical system of FIGS. 2 through 5 according to an exemplary embodiment.

FIG. 6 is a view illustrating an entire optical path of the optical system 100 of FIGS. 2 through 5 according to an exemplary embodiment.

Referring to FIG. 6, irrespective of an incident angle of incident light, as light passes through the first through third optical devices 110, 120, and 130, focal points may be formed on the image plane S1. Also, a position at which a focal point is formed on the image plane S1 may vary according to the incident angle of incident light. Accordingly, when a plurality of light-receiving units having different coordinates are provided on the image plane S1, each of the light-receiving units may correspond to a pixel.

The first through third optical devices 110, 120, and 130 may be designed to offset chromatic aberration and geometric aberration which may alter a path of light. To this end, the shapes, cross-sectional areas, heights, material compositions, and intervals of the nanostructures 112, 122, and 132 respectively included in the first through third optical devices 110, 120, and 130 may be appropriately determined.

The first through third optical devices 110, 120, and 130 are thin-lenses respectively including the nanostructures 112, 122, and 132 in FIGS. 2 through 6. However, the present exemplary embodiment is not limited thereto. For example, any two of the first through third optical devices 110, 120, and 130 may be thin-lenses and the remaining one may be an optical lens using a refractive index-based method. Alternatively, any one of the first through third optical devices 110, 120, and 130 may be a thin-lens and the remaining two may be optical lenses using a refractive index-based method.

Figure 7:
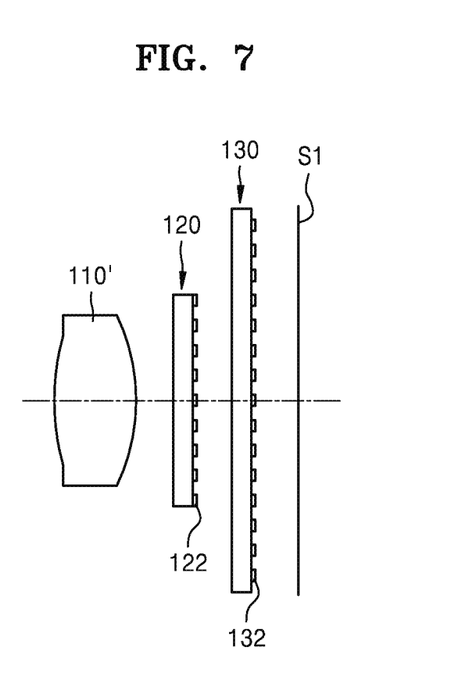
FIG. 7 is a view of an optical system according to an exemplary embodiment.

FIG. 7 is a view of the optical system 100 according to an exemplary embodiment.

Referring to FIG. 7, the first optical device 110 may be an optical device using a refractive index-based method, and the second and third optical devices 120 and 130 may be thin-lenses respectively including the nanostructures 122 and 132. The nanostructures 122 and 132 of the second and third optical devices 120 and 130 may be designed to minimize chromatic aberration that occurs in the second and third optical devices 120 and 130. To this end, shapes, cross-sectional areas, heights, material compositions, and intervals of the nanostructures 122 and 132 respectively included in the second and third optical devices 120 and 130 may be appropriately determined.

The first optical device 110 may be designed to correct at least one of chromatic aberration and geometric aberration not corrected by the second and third optical devices 120 and 130. To this end, a refractive index of the first optical device 110 may be determined by appropriately selecting a material included in the first optical device 110. Also, lens characteristics of the first optical device 110 may be adjusted by changing a surface shape and a thickness of the first optical device 110.

Figure 8:
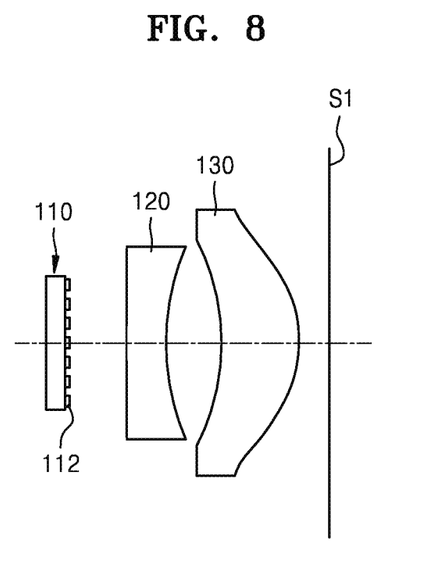
FIG. 8 is a view of an optical system according to an exemplary embodiment.

FIG. 8 is a view of the optical system 100 according to an exemplary embodiment.

Referring to FIG. 8, the first optical device 110 may be a thin-lens including the nanostructures 112, and the second and third optical devices 120 and 130 may be optical lenses using a refractive index-based method. The nanostructures 112 of the first optical device 110 may be designed to offset at least one of chromatic aberration and geometric aberration that occur in the second and third optical devices 120 and 130. To this end, shapes, cross-sectional areas, heights, material compositions, and intervals of the nanostructures 112 included in the first optical device 110 may be appropriately determined.

The first optical device 110 is separate from the second optical device 120 in FIG. 8. However, since the first optical device 110 is a thin-lens and there is no limitation in a surface shape, the first optical device 110 may be integrally formed with the second optical device 120.

Figure 9:
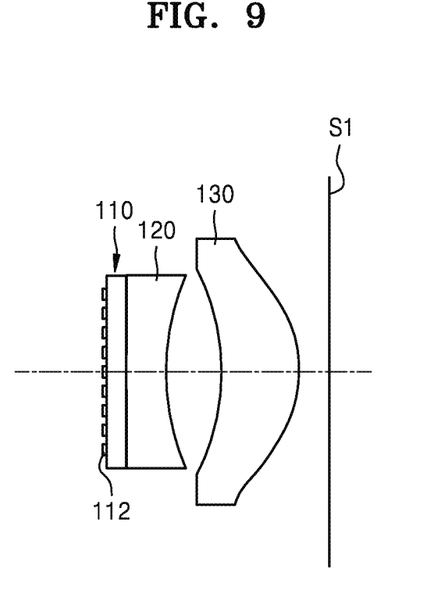
FIG. 9 is a view of an optical system according to an exemplary embodiment.

FIG. 9 is a view of the optical system 100 according to an exemplary embodiment.

Referring to FIG. 9, the first optical device 110 that is a thin-lens may be provided on a surface of the second optical device 120. Although the first optical device 110 is provided on a surface of the second optical device 120 on which light is incident in FIG. 9, the present exemplary embodiment is not limited thereto. For example, the first optical device 110 may be provided on a surface of the second optical device 120 facing the image plane S1.

When the first optical device 110 is provided on a surface of the second optical device 120 as shown in FIG. 9, since there is no interval between the first optical device 110 and the second optical device 120, a size of the optical system 100 may be reduced.

Figure 10:
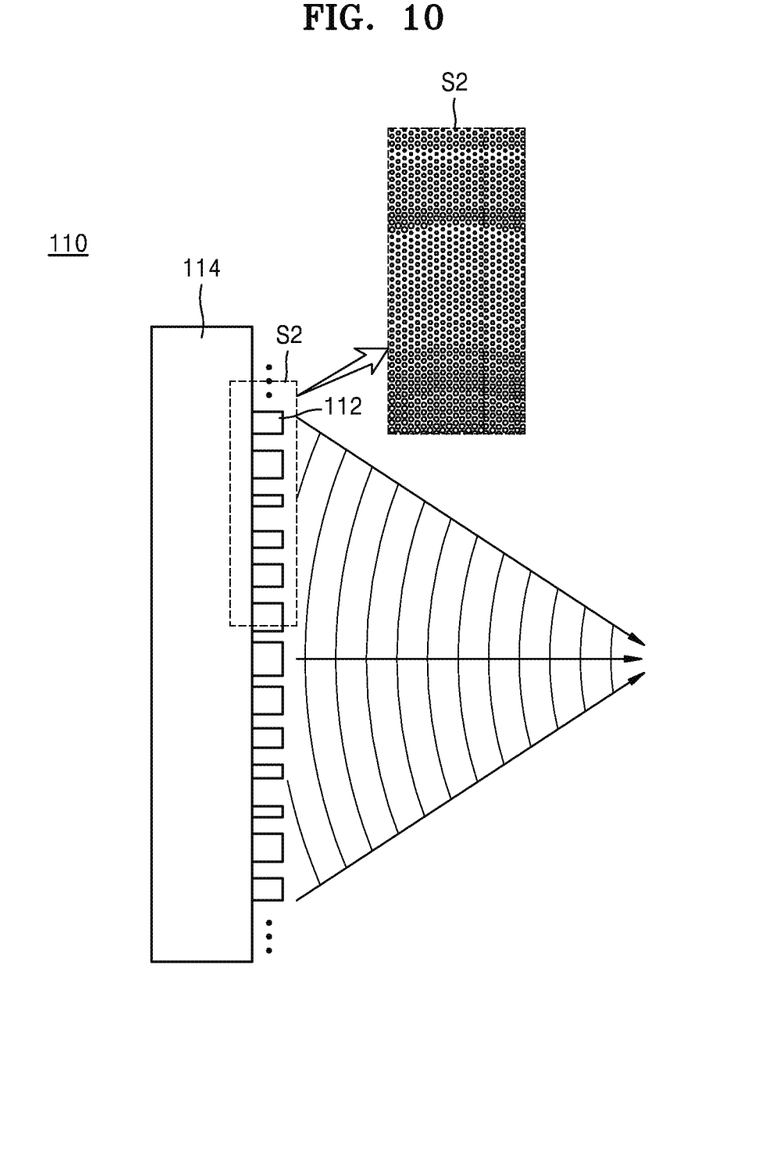
FIG. 10 is a view of a thin-lens according to an exemplary embodiment.

FIG. 10 is a view of a thin-lens described in the above according to an exemplary embodiment.

With reference to FIG. 10, exemplary embodiments of the first optical device 110 of FIGS. 2 through 6 will be explained.

Referring to FIG. 10, the first optical device 110 that is a thin-lens may include the plurality of nanostructures 112 and a substrate 114 on which the nanostructures 112 are arranged. The substrate 114 may be a support for forming the nanostructures 112. Also, a material layer (not shown) that surrounds the nanostructures 112 may be added. FIG. 10 is a conceptual view of the nanostructures 112, and actual sizes and numbers of the nanostructures 112 may be different from those shown in FIG. 10.

Referring to an alternate view of a surface S2 in FIG. 10, shapes, materials, and arrangements of the nanostructures 112 may vary according to positions on the first optical device 110. Since shapes, materials, and arrangements of the nanostructures 112 vary according to positions on the first optical device 110, travel directions of transmitted light may be changed by determining a transmission phase distribution of light according to positions on the first optical device 110.

Figure 11:
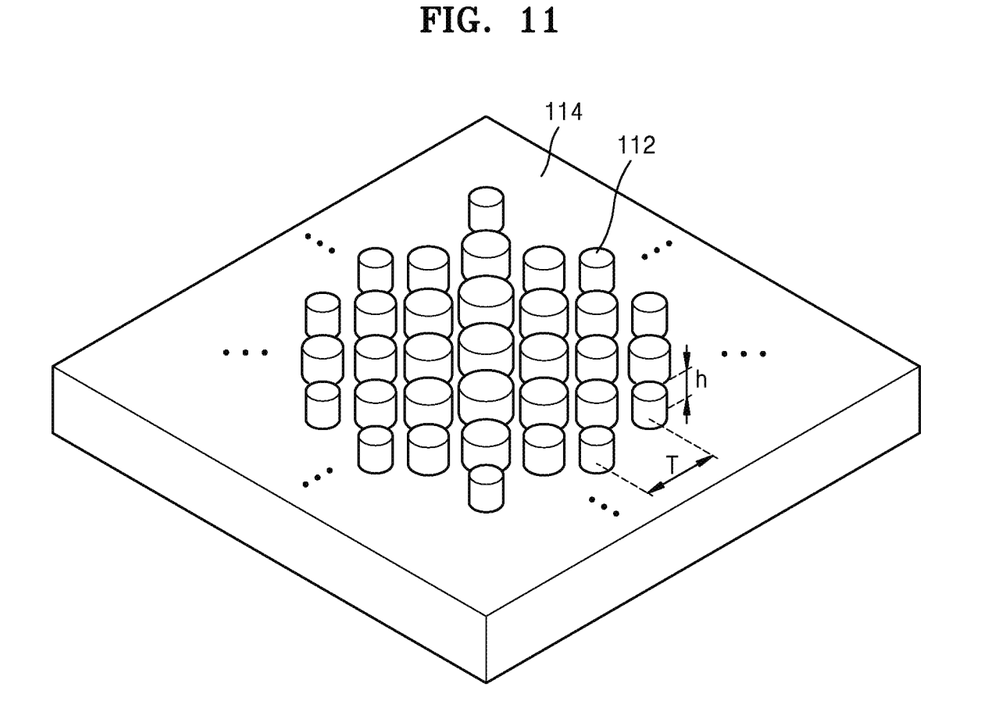
FIG. 11 is a view illustrating a part of a surface of the first optical device of FIG. 10 according to an exemplary embodiment.

FIG. 11 is a view illustrating a part of a surface of the first optical device 110 of FIG. 10 according to an exemplary embodiment.

Referring to FIG. 11, the nanostructures 112 having circular cylindrical shapes may be arranged on the substrate 114. Although the nanostructures 112 have circular cylindrical shapes in FIG. 11, the present exemplary embodiment is not limited thereto. For example, the nanostructures 112 may have any of various shapes such as polygonal prism shapes, circular cylindrical shapes, or elliptic cylindrical shapes. Alternatively, cross-sections of the nanostructures 112 may have "L"-like prism shapes.

Shapes of the nanostructures 112 may not be symmetric in a specific direction. For example, cross-sections of the nanostructures 112 may not be symmetric in a horizontal direction, to have, for example, elliptic shapes. Also, since cross-sections of the nanostructures 112 vary according to heights, shapes of the nanostructures 112 may not be symmetric in a vertical direction.

A refractive index of a material included in the nanostructures 112 may be greater (for example, by 1.5 or more) than a refractive index of materials composing the substrate 114, a material layer (not shown), which may surround the nanostructures 112 and a peripheral portion. Accordingly, the substrate 114 may include a material with a relatively low refractive index and the nanostructures 112 may include a material with a relatively high refractive index.

For example, the nanostructures 112 may include at least one of crystalline silicon (c-Si), polycrystalline silicon (poly-Si), amorphous silicon (a-Si), $Si_3N_4$, GaP, $TiOO_2$, AlSb, AlAs, AlGaAs, AlGaInP, BP, and ZnGeP2. Also, the substrate 114 may include any one of a polymer (e.g., poly(methyl methacrylate) (PMMA)), plastic, and $SiO_2$ (e.g., glass or quartz).

The first through third optical devices 110, 120, and 130 may change a direction of incident light according to a wavelength of the incident light. Accordingly, the optical system 100 may be configured so that only incident light of a predetermined wavelength range forms a focal point on the image plane S1. A wavelength that is allowed by the optical system 100 to form a focal point on the image plane S1 in a wavelength range of incident light is referred to as an operating wavelength. The operating wavelength may include, for example, a wavelength (about 650 nm) of red light, a wavelength (about 475 nm) of blue light, and a wavelength (about 510 nm) of green light. Also, the operating wavelength may include a wavelength (about 800 nm to 900 nm) of infrared light. The values are exemplary, and the operating wavelength of the optical system 100 may be set in other ways. For example, a band of wavelengths can be set as an operating wavelength range.

Once the operating wavelength is determined, the first through third optical devices 110, 120, and 130 may also be designed to correspond to the operating wavelength. For example, detailed shapes (e.g., intervals, cross-sectional shapes, or heights) and materials of the nanostructures 122, 122, and 132 respectively included in the first through third optical devices 110, 120, and 130 may be determined to correspond to the operating wavelength.

Referring back to FIG. 11, an interval T between adjacent nanostructures of the nanostructures 112 may be less than the operating wavelength of the optical system 100. For example, the interval T between the nanostructures 112 may be equal to or less than ¾ or ⅔ of the operating wavelength of the optical system 100 or may be equal to or less than ½ of the operating wavelength. A height h of each of the nanostructures 112 may be equal to or less than ⅔ of the operating wavelength. The interval T, height h and shape of the nanostructures may vary depending on the location of the nanostructures in the thin-lens.

Figure 12:
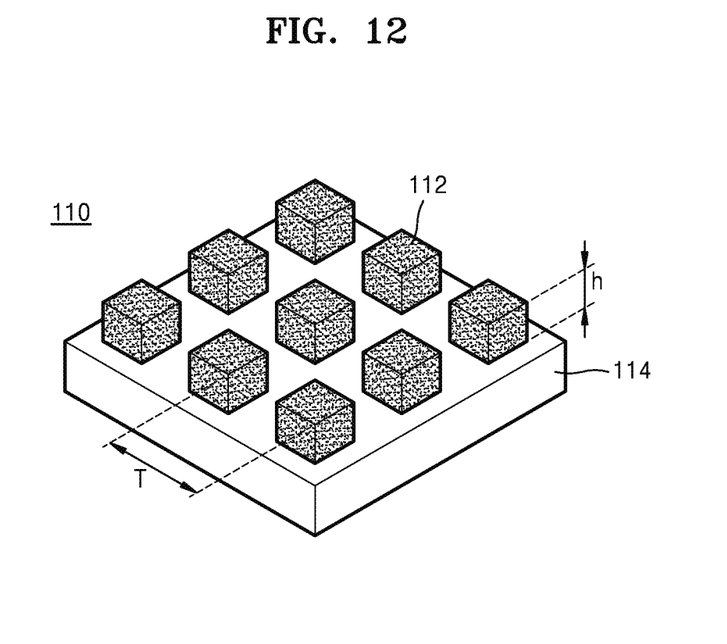
FIG. 12 is a view illustrating a surface of the first optical device of FIG. 10 according to another exemplary embodiment.

FIG. 12 is a view illustrating a surface of the first optical device 110 of FIG. 10 according to another exemplary embodiment.

Referring to FIG. 12, the nanostructures 112 having rectangular parallelepiped shapes may be arranged on the substrate 114. Although the nanostructures 112 have rectangular parallelepiped shapes in FIG. 12, the present exemplary embodiment is not limited thereto. For example, the nanostructures 112 may have any of various shapes such as polygonal prism shapes, circular cylindrical shapes, or elliptic cylindrical shapes. Alternatively, cross-sections of the nanostructures 112 may have prism shapes.

Heights and intervals of the nanostructures 112 may be determined according to an operating wavelength of the optical system 100. An interval T between adjacent nanostructures of the nanostructures 112 may be less than the operating wavelength of the optical system 100. For example, the interval T between the nanostructures 112 may be equal to or less than ¾ or ⅔ of the operating wavelength of the optical system 100, or may be equal to or less than ½ of the operating wavelength. Also, a height h of each of the nanostructures 112 may be less than the operating wavelength. For example, the height h of each of the nanostructures 112 may be equal to or less than ⅔ of the operating wavelength. The interval T, height h and shape of the nanostructures may vary depending on the location of the nanostructures in the thin-lens.

The description of the substrate 114 and the nanostructures 112 made with reference to FIGS. 11 and 12 may apply to the second and third optical devices 120 and 130. That is, when the second and third optical devices 120 and 130 are thin-lenses, the description of the nanostructures 112 made with reference to FIGS. 11 and 12 may apply to the nanostructures 122 and 132 respectively included in the second and third optical devices 120 and 130.

Figure 13:
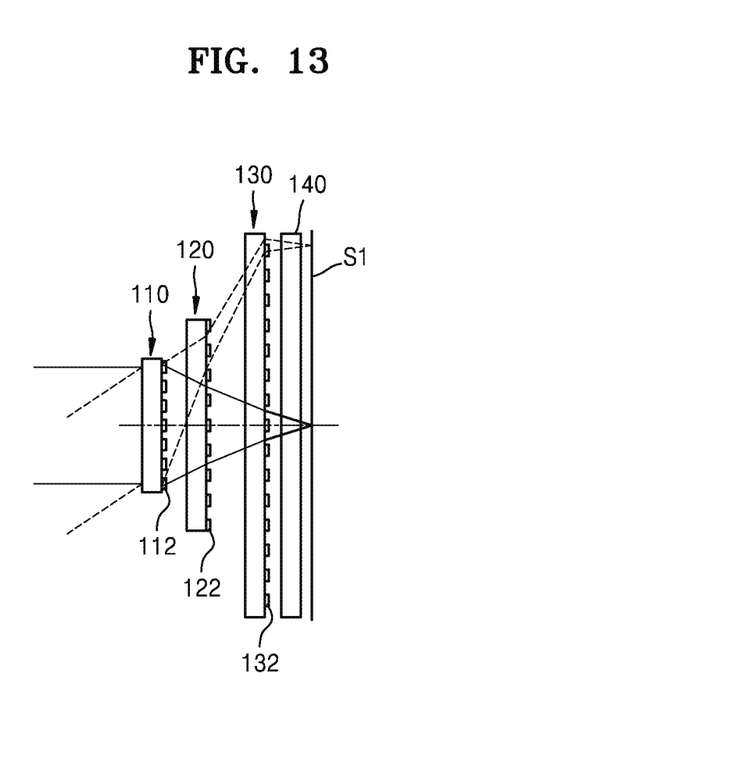
FIG. 13 is a view of the optical system according to an exemplary embodiment.

FIG. 13 is a view of the optical system 100 according to an exemplary embodiment.

In FIG. 13, a repeated explanation of the same elements or operations as those in FIGS. 1 through 12 will not be given.

Referring to FIG. 13, the optical system 100 according to an exemplary embodiment may further include an optical filter 140 configured to prevent light having a wavelength other than operating wavelength range from being incident on the image plane S1. Although the optical filter 140 is provided between the third optical device 130 and the image plane S1 in FIG. 13, a position of the optical filter 140 is not limited thereto. The optical filter 140 may be provided between the second optical device 120 and the third optical device 130 or may be provided between the first optical device 110 and the second optical device 120. Alternatively, the optical filter 140 may be provided in front of an incident surface of the optical filter 110 and may enable only light having the operating wavelength from among incident light to be incident on the first optical device 110.

The optical filter 140 may absorb or reflect light having wavelengths other than the operating wavelength range of the optical system 100 from among light incident on the optical filter 140. The optical filter 140 may prevent light having wavelengths other than the operating wavelength range from being incident as noise on the image plane S1.

Figure 14:
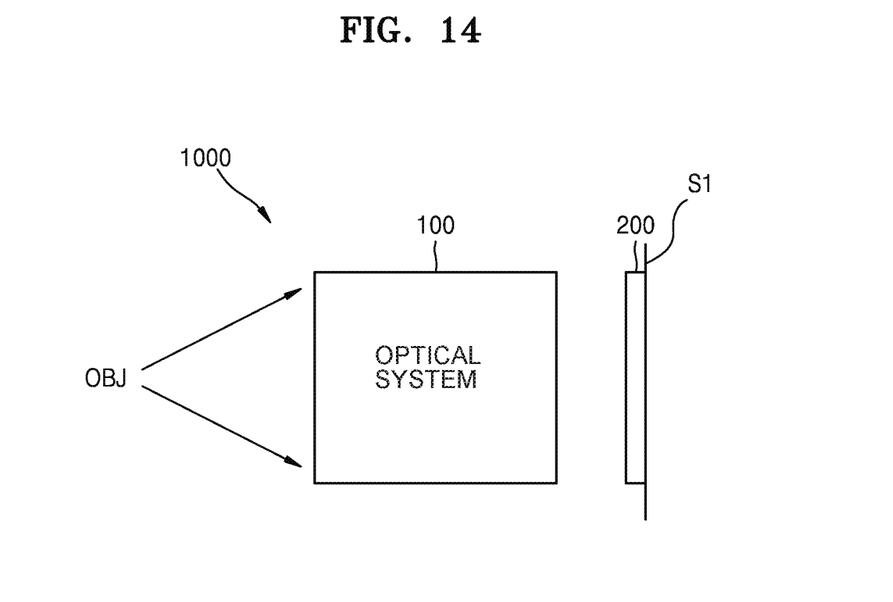
FIG. 14 is a view of an image sensor according to an exemplary embodiment.

FIG. 14 is a view of an image sensor 1000 according to an exemplary embodiment.

Referring to FIG. 14, the image sensor 1000 according to an exemplary embodiment may include the optical system 100 and a light measurer 200 provided to correspond to the optical system 100.

The description of the optical system 100 made with reference to FIGS. 2 through 13 may apply to the optical system 100 of FIG. 14. The light measurer 200 may be provided on the image plane S1 of the optical system 100. The light measurer 200 may measure light focused by the optical system 100. The light measurer 200 may include a plurality of light sensors. As the number of the light sensors included in the light measurer 200 increases, a resolution of an image output from the light measurer 200 may increase. The light sensor may be a pixel array of a complementary metal-oxide-semiconductor (CMOS) image sensor (CIS) using a charge-coupled device (CCD) or a CMOS. Alternatively, the light sensor may be a photodiode sensor.

Figure 15:
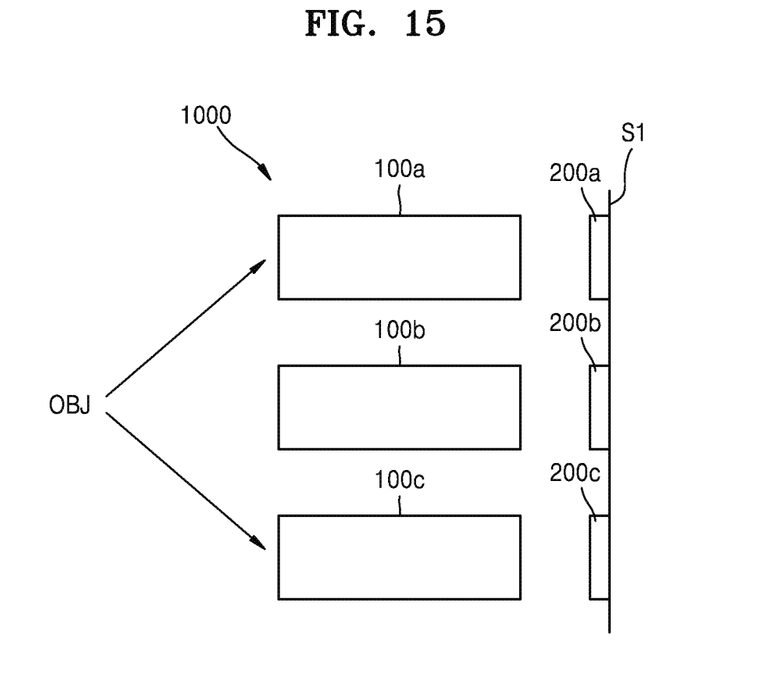
FIG. 15 is a view of the image sensor according to an exemplary embodiment.

FIG. 15 is a view of the image sensor 1000 according to an exemplary embodiment.

Referring to FIG. 15, the image sensor 1000 according to an exemplary embodiment may include a plurality of optical systems, for example, first through third optical systems 100a, 100b, and 100c. At least two of the first through third optical systems 100a, 100b, and 100c may have different operating wavelengths. That is, at least two of the first through third optical systems 100a, 100b, and 100c may concentrate light having different wavelengths so that the light having different wavelengths are directed to the image plane S1. Also, each of the first through third optical systems 100a, 100b, and 100c may include an optical filter for filtering light having wavelengths other than an operating wavelength range from among incident light.

For example, the first optical system 100a may focus red light, the second optical system 100b may focus blue light, and the third optical system 100c may focus green light. However, the present exemplary embodiment is not limited thereto, and operating wavelengths of the optical systems 100a, 100b, and 100c may be set in other ways. Also, all of the first through third optical systems 100a, 100b, and 100c may have different operating wavelengths, or some of the first through third optical systems 100a, 100b, and 100c may have the same operating wavelength.

The image sensor 1000 may include a plurality of light measurers 200a, 200b, and 200c provided to respectively correspond to the first through third optical systems 100a, 100b, and 100c. The light measurers 200a, 200b, and 200c may be provided on the image planes Si of the first through third optical systems 100a, 100b, and 100c and may generate images of an object OBJ by measuring light focused by the optical systems 100a, 100b, and 100c.

The optical system 100 and the image sensor 1000 including the optical system 100 according to the one or more exemplary embodiments have been described with reference to FIGS. 1 through 15. As described above, since at least one of the first through third optical devices 110, 120, and 130 of the optical system 100 is a thin-lens including nanostructures, a thickness of the optical system 100 may be reduced. Also, chromatic aberration and geometric aberration of the optical system 100 may be reduced.

Since the optical system 100 and the image sensor 1000 according to the one or more embodiments may be easily made compact, the optical system 100 and the image sensor 1000 may be applied to a camera requiring a small pixel and a high resolution. Also, the optical system 100 and the image sensor 1000 may be applied to a pixel array of a color image sensor for a light field 3D camera requiring a lot of pixel information. Also, the optical system 100 and the image sensor 1000 may be applied to a sensor array for hyperspectral imaging. In addition, the optical system 100 and the image sensor 1000 may be included in an optical bio-sensor such as a blood pressure sensor or a heart rate sensor using a spectrometer.

While one or more exemplary embodiments have been described with reference to the figures, it will be understood by those of ordinary skill in the art that various changes in form and details may be made therein without departing from the spirit and scope as defined by the following claims.

What is claimed is:

1. An optical system comprising:
   a first optical device configured to focus light, such that a focal point of light transmitted through the first optical device is dependent on an angle at which the light is incident on the first optical device;
   a second optical device disposed such that light transmitted through the first optical device is incident on the second optical device, and configured such that a focal length of light transmitted through the second optical device is dependent on a position on the second optical device on which the light is incident; and
a third optical device disposed such that light transmitted through the second optical device is incident on the third optical device and configured such that light transmitted through the third optical device forms at least one focal point on an image plane,
wherein at least one of the second optical device and the third optical device is a thin lens comprising a plurality of nanostructures and the thin lens is configured to correct at least one of a chromatic aberration and a geometric aberration that occurs in the remaining optical devices, and
wherein an interval between the nanostructures is equal to or less than ¾ of a wavelength of the light.

2. An optical system comprising:
a first optical device configured to focus light, such that a focal point of light transmitted through the first optical device is dependent on an angle at which the light is incident on the first optical device;
a second optical device disposed such that light transmitted through the first optical device is incident on the second optical device, and configured such that a focal length of light transmitted through the second optical device is dependent on a position on the second optical device on which the light is incident; and
a third optical device disposed such that light transmitted through the second optical device is incident on the third optical device and configured such that light transmitted through the third optical device forms at least one focal point on an image plane,
wherein the second optical device or the third optical device is a thin lens comprising a plurality of nanostructures and the thin lens is configured to correct at least one of a chromatic aberration and a geometric aberration that occurs in the remaining optical devices,
wherein the second optical device is configured such that light incident on a central portion of the second optical device is focused by a first focal length and light incident on a peripheral portion of the second optical device spaced away from the central portion of the second optical device is focused at a second focal length that is longer than the first focal length.

3. An optical system comprising:
a first optical device configured to focus light, such that a focal point of light transmitted through the first optical device is dependent on an angle at which the light is incident on the first optical device;
a second optical device disposed such that light transmitted through the first optical device is incident on the second optical device, and configured such that a focal length of light transmitted through the second optical device is dependent on a position on the second optical device on which the light is incident; and
a third optical device disposed such that light transmitted through the second optical device is incident on the third optical device and configured such that light transmitted through the third optical device forms at least one focal point on an image plane,
wherein at least one of the second optical device and the third optical device is a thin lens comprising a plurality of nanostructures and the thin lens is configured to correct at least one of a chromatic aberration and a geometric aberration that occurs in the remaining optical devices, and
wherein each of the plurality of nanostructures has a refractive index that is greater than a refractive index of a medium outside the plurality of nanostructures,
wherein the third optical device is configured such that light incident on central portion of the third optical device is focused by a first focal length and light incident on a peripheral portion of the third optical device spaced away from the central portion of the third optical device is focused by a second focal length that is shorter than the first focal length.

4. The optical system of claim 1, wherein the first optical device has positive refractive power, the second optical device has negative refractive power, and the third optical device has positive refractive power.

5. The optical system of claim 1, wherein the third optical device refracts light transmitted therethrough to be incident on the image plane at an angle normal to the image plane.

6. The optical system of claim 1, wherein the first optical device is a refractive optical lens, and each of the second optical device and the third optical device is the thin lens comprising the plurality of nanostructures.

7. The optical system of claim 6, wherein the plurality of nanostructures of the second optical device and the plurality of nanostructures of the third optical device are configured to offset chromatic aberration of the second optical device and the third optical device with each other.

8. The optical system of claim 7, wherein the first optical device is configured to offset at least one of a geometric aberration and a chromatic aberration of at least one of the second optical device and the third optical device.

9. The optical system of claim 1, wherein the first optical device is a thin lens.

10. The optical system of claim 9, wherein the plurality of nanostructures of the first optical device are configured to offset at least one of a chromatic aberration and a geometric aberration that occur in at least one of the second optical device and the third optical device.

11. The optical system of claim 9, wherein the first optical device is disposed on a surface of the second optical device.

12. The optical system of claim 1, wherein the thin lens further comprises a substrate, and the plurality of nanostructures are disposed on a surface of the substrate.

13. The optical system of claim 12, wherein the refractive index of each of the plurality of nanostructures is greater than a refractive index of the substrate.

14. The optical system of claim 12, wherein the substrate comprises at least one material selected from a group consisting of SiO2, plastic, and poly(methyl methacrylate) (PMMA), and each of the plurality of nanostructures comprises at least one material selected from a group consisting of crystalline silicon (c-Si), polycrystalline silicon (p-Si), amorphous silicon (a-Si), III-V compound semiconductors, SiC, TiO2, and SiN.

15. The optical system of claim 1, wherein each of the plurality of nanostructures has at least one of a circular cylindrical shape, an elliptic cylindrical shape, a rectangular parallelepiped and a polygonal prism shape.

16. The optical system of claim 1, wherein at least one of the first optical device, the second optical device, and the third optical device is configured such that light of only a predetermined wavelength range from among light incident on the first optical device forms a focal point on the image plane.

17. The optical system of claim 16, further comprising an optical filter which blocks light having a wavelength outside the predetermined wavelength range.

18. The optical system of claim 1, wherein the nanostructures are provided on a surface of the thin lens on which the light is incident.

19. The optical system of claim 1, wherein the nanostructures are provided on both surfaces of the thin lens.

* * * * *